(12) United States Patent
Streit et al.

(10) Patent No.: US 9,908,275 B2
(45) Date of Patent: Mar. 6, 2018

(54) HIGH CAPACITY DUAL DIE ASSEMBLY

(71) Applicant: Wenger Manufacturing, Inc., Sabetha, KS (US)

(72) Inventors: Brian D. Streit, Laramie, WY (US); Marc Wenger, Sabatha, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 174 days.

(21) Appl. No.: 14/822,019

(22) Filed: Aug. 10, 2015

(65) Prior Publication Data

US 2017/0043519 A1    Feb. 16, 2017

(51) Int. Cl.

| | |
|---|---|
| *B29B 9/06* | (2006.01) |
| *B29C 47/30* | (2006.01) |
| *B29C 47/70* | (2006.01) |
| *B29C 47/00* | (2006.01) |
| *B29C 47/08* | (2006.01) |
| *B29C 47/40* | (2006.01) |

(52) U.S. Cl.
CPC ............ *B29C 47/0014* (2013.01); *B29B 9/06* (2013.01); *B29C 47/0066* (2013.01); *B29C 47/084* (2013.01); *B29C 47/30* (2013.01); *B29C 47/70* (2013.01); *B29C 47/0004* (2013.01); *B29C 47/40* (2013.01)

(58) Field of Classification Search
CPC ........... B29B 9/06; B29B 9/065; B29C 47/30; B29C 47/70; D01D 4/06
See application file for complete search history.

(56) References Cited

U.S. PATENT DOCUMENTS

| | | |
|---|---|---|
| 3,230,902 A | 1/1966 | Grimm et al. |
| 3,813,082 A | 5/1974 | Manser |
| (Continued) | | |

FOREIGN PATENT DOCUMENTS

| | | |
|---|---|---|
| JP | 101091948 A | 7/1998 |
| JP | H119197 A | 1/1999 |

OTHER PUBLICATIONS

"Ring Die Aquatic Feed Pellet Mill" Product Brochure. Available online at http://www.feed-pellet-mill.com/product/Feed-Pellet-Mill/ring-die-aquatic-feed-pellets-mill.html (Accessed Jun. 30, 2015).

(Continued)

*Primary Examiner* — Alison L Hindenlang
*Assistant Examiner* — Joseph S Leyson
(74) *Attorney, Agent, or Firm* — Hovey Williams LLP

(57) ABSTRACT

An improved, high-capacity die assembly (10) for a food or feed extruder (12) is provided and is particularly useful for the production of high quality aquatic feeds. The die assembly (10) includes a mount (20), which is secured to the discharge end of an extruder barrel (14), with a plurality of tubular die components (22, 24) coupled with the mount (20). Each component (22,24) includes wall structure (38) defining an outwardly diverging tubular chamber (40) with a die plate assembly (50) coupled to the outer end of the wall structure (38). A flow diverter element (54) is located within each chamber (40) and has a large diameter end adjacent the assembly (50) and a smaller diameter end closer to the chamber inlet. The assembly (50) has a plurality of openings (52) outboard of the element (54).

19 Claims, 3 Drawing Sheets

(56) References Cited

U.S. PATENT DOCUMENTS

| | | | |
|---|---|---|---|
| 4,032,279 A * | 6/1977 | Kim | B29C 47/707 |
| | | | 264/209.8 |
| 4,123,207 A * | 10/1978 | Dudley | B29B 9/065 |
| | | | 425/378.1 |
| 5,171,090 A | 12/1992 | Wiemers | |
| 5,223,296 A | 6/1993 | Van der Wansem et al. | |
| 5,242,292 A | 9/1993 | Wenger | |
| 5,540,900 A | 7/1996 | Poncet | |
| 6,019,916 A * | 2/2000 | Mizuguchi | B29B 9/06 |
| | | | 264/140 |
| 6,531,077 B1 | 3/2003 | Flarup-Knudsen | |
| 7,654,813 B1 | 2/2010 | Kearns et al. | |
| 8,114,454 B2 | 2/2012 | Clark et al. | |
| 2005/0092365 A1 | 5/2005 | Rawes et al. | |

OTHER PUBLICATIONS

Sprout. "Controlled starch cook and bulk density of dry pet food—Is this for real?" Engormix. Available online at http://en.engormix.com/MA-feed-machinery/formulation/articles/controlled-starch-cook-bulk-t236/p0.htm (Accessed Jul. 7, 2015).

* cited by examiner

HIGH CAPACITY DUAL DIE ASSEMBLY

BACKGROUND OF THE INVENTION

Field of the Invention

The present invention is broadly concerned with improved, high capacity die assemblies, the combination of such assemblies with food or feed extruders, and corresponding methods. More particularly, the invention is concerned with such die assemblies including a plurality of structurally distinct, tubular die components, each having wall structure defining an outwardly diverging tubular chamber with an outboard die plate; a diverging flow diverter element is located within each chamber and has a large diameter end adjacent the die plate and a remote small diameter end. The die assemblies are operable to produce high quality extrudates, such as aquatic feeds, at high production rates Description of the Prior Art Many types of foods or feeds are produced using extrusion equipment. Generally speaking, such extruders include an elongated, tubular barrel having one or more elongated, axially rotatable, helically flighted extrusion screws within the barrel. The discharge end of the barrel is equipped with a die having a plurality of restricted orifice die openings therethrough. In use, starting materials are fed into the barrel and are subjected to increasing levels of pressure, temperature, and shear within the barrel, and are ultimately extruded through the die.

In the production of certain types of aquatic feeds known as "micro feeds," the outlet die has relatively small through openings to generate thin, needle-like extrudates. It has been found that production of these micro feeds is often limited by the amount of surface area on the die. Thus, while a given extruder may normally be able to produce high quantities of product, when used to produce micro feeds, the production capacity of the extruder is severely limited. Indeed, in some instances, micro feed production is limited to approximately one-half the rated capacity of the extruder.

A variety of different extruders and die assemblies have been proposed in the past. Representative references include U.S. Pat. Nos. 3,230,902, 3,813,082, 5,171,090, 5,223,296, 5,242,292, 5,540,900, 6,531,077, 7,654,813, and 8,114,454; US Patent Publication No. 2005/0092365; foreign patents JP10191948 and JP11009197; and non-patent literature: "Ring Die Aquatic Feed Pellet Mill" http://www.feed-pellet-mill.com/product/Feed-Pellet-Mill/ring-die-aquatic-feed-pellets-mill.html (Accessed Jun. 30, 2015), and Sprout "Controlled starch cook and bulk density of dry pet food—Is this for real?" http://en.engormix.com/MA-feed-machinery/formulation/articles/controlled-starch-cook-bulk-t236/p0.htm (Accessed Jul. 7, 2015).

SUMMARY OF THE INVENTION

The present invention overcomes the problems outlined above, and provides high-capacity die assemblies for use with food or feed extruders in order to create extrudates at high production levels, even in the case of micro feeds or related products. Generally speaking, the die assemblies of the invention are mounted on a food or feed extruder including a tubular barrel presenting a discharge opening. The die assemblies comprise a die assembly mount configured to be secured to the extruder barrel, together with a plurality of tubular die components coupled with the mount and in communication with the extruder barrel. Each die component includes wall structure defining an outwardly diverging tubular chamber presenting an inlet end adjacent the mount and an opposed outlet end remote from the inlet end. A die plate is secured to the outlet end and has an inner surface and an outer surface. A diverging flow diverter element is located within the chamber and has a large diameter end adjacent the inner surface of the die plate and an opposed small diameter end closer to the chamber inlet end. The die plate has a plurality of die openings therethrough located outboard of the large diameter end of the diverter element.

Preferably, the large diameter end of the flow diverter is secured to the inner surface of the die plate and is generally conical in shape, having a cone angle of from about 8-30°, more preferably from about 12-25°. Correspondingly, the wall structure of each die component is substantially frustoconical in shape and has an average diverging angle of from about 8-40°, more preferably from about 10-30°.

Additionally, in some instances it is desirable to make use of a flow-restricting venturi proximal to the inlet end of the chamber, typically in the form of a venturi ring. This serves to reduce the cross-sectional area at the inlet of the chamber, relative to the upstream mount. Normally, the venturi should present a reduction in cross-sectional area of from about 15-60%, more preferably from about 30-45%, as compared with the cross-sectional area of the inlet end of the chamber.

As indicated previously, the die assemblies of the invention are normally used in combination with a food or feed extruder, and are mounted on the discharge end of the latter.

Methods in accordance with the invention for the extrusion of food or feed materials from an extruder barrel having a discharge opening, comprise the steps of first directing the food or feed material from the discharge opening under pressure into and through a plurality of tubular die components. The food or feed material is caused to pass through the tubular die components to assume respective, outwardly diverging, annular flow paths. Such material is then passed through a plurality of restricted orifice die openings adjacent the end of the tubular die components remote from the discharge opening. Advantageously, the method includes the step of causing the pressures of the material passing through the restricted orifice die openings of each tubular die component to be substantially equal, and preferably at least about 90% equal.

The product formulations useful in the invention can have wide variances in particular ingredients and amounts thereof. Generally speaking though, more or less conventional food or feed formulations are useful. In some instances, it may be appropriate to add small quantities of oil in order to facilitate production and to make equipment cleanup easier.

DETAILED DESCRIPTION OF THE PREFERRED EMBODIMENT

Figure 4:
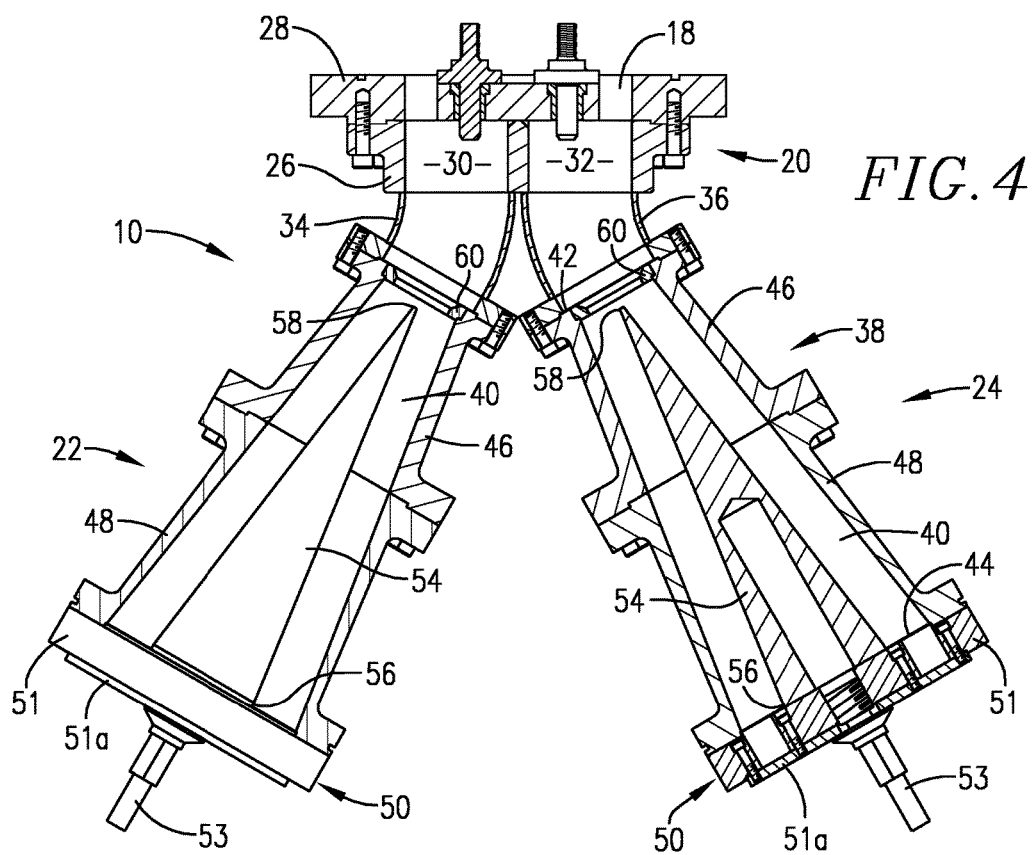
FIG. 4 is a sectional view taken along line 4-4 of FIG. 3, illustrating the internal construction of the die assembly.
Figure 4A:
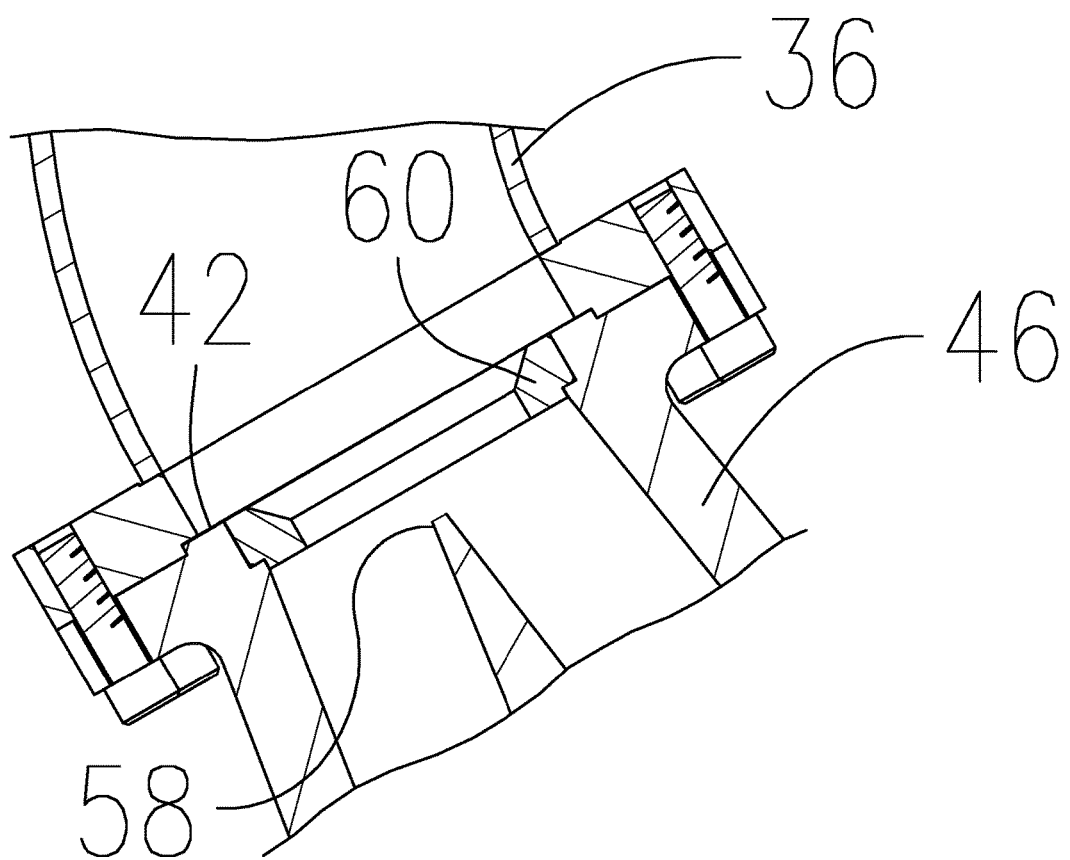
FIG. 4A is a fragmentary, enlarged view of a portion of FIG. 4, illustrating the venturi structure.

Turning now to the drawings, a die assembly 10 is depicted, which is designed to be mounted to the discharge end of an extruder 12, the latter having a multiple-head barrel 14 and one or more elongated, axially rotatable, helically flighted extrusion screws 16 within the barrel 14; the barrel 14 has a discharge opening 18 (see FIG. 4). In the depicted embodiment, the extruder 12 is a twin-screw extruder commercialized by Wenger Manufacturing, Inc. of Sabetha, Kans., although other types of twin- and single-screw extruders could also be employed.

The die assembly 10 generally includes a mount 20 and a plurality (here two) of tubular die components 22 and 24 supported by the mount 20. As best illustrated in FIG. 4, mount 20 includes a plate 26, which is affixed to the terminal flange 28 of extruder barrel 14. The plate 26 has a pair of passageways 30, 32 in communication with discharge opening 18. A pair of tubular, arcuate, relatively out-turned transitions 34 and 36 are secured to the plate 26 as shown.

Figure 1:
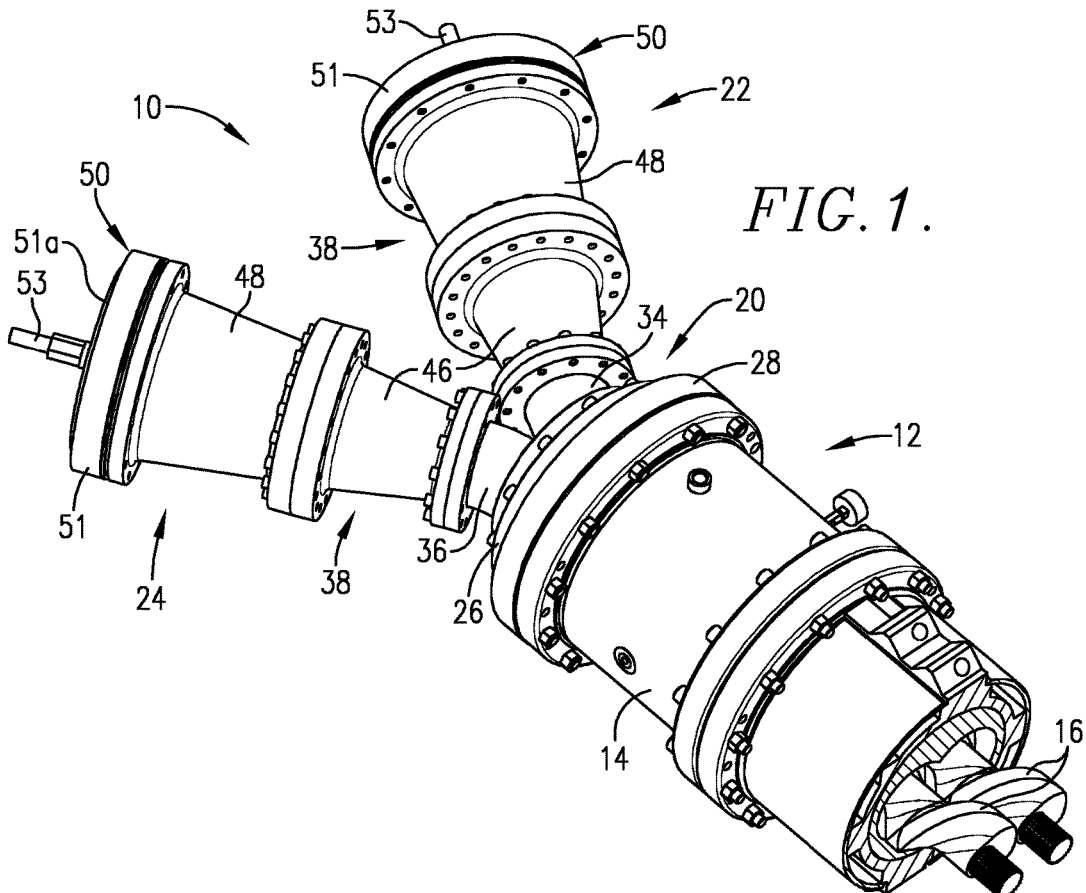
FIG. 1 is a fragmentary perspective view illustrating the output end of a twin screw extruder, with a die assembly in accordance with the invention operably coupled with the extruder output end.
Figure 2:
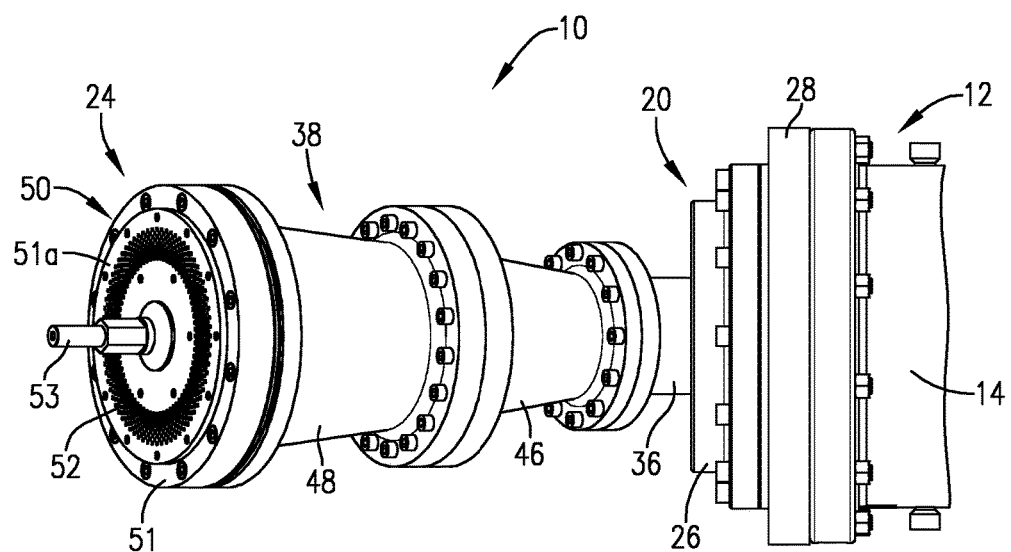
FIG. 2 is an elevational view of the structure illustrated in FIG. 1.
Figure 3:
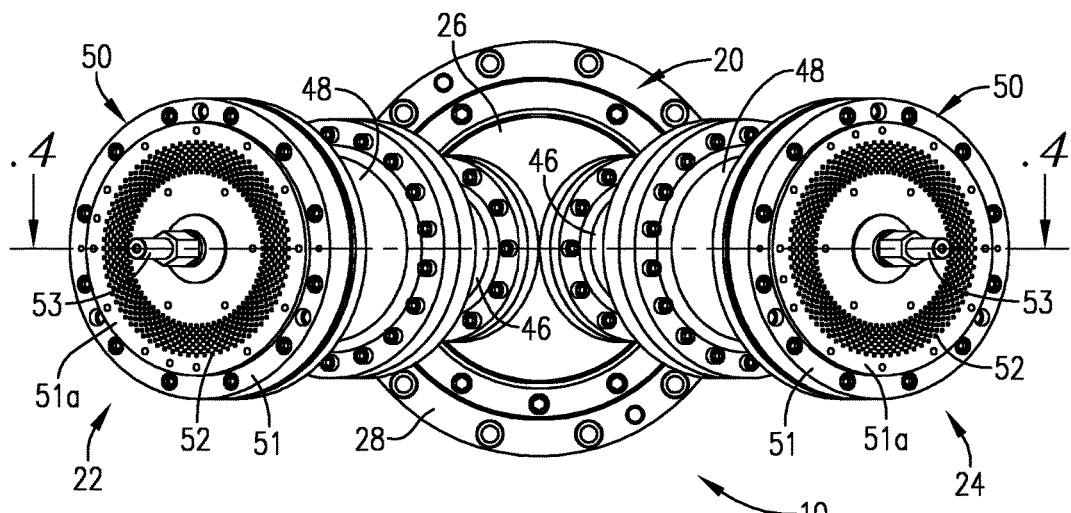
FIG. 3 is an end view of the structure illustrated in FIG. 1, depicting the output end of the die assembly.

The die components 22, 24 are identical, and thus only the component 24 will be described in detail. As illustrated, the component 24 has wall structure 38, which defines an outwardly diverging tubular chamber 40 presenting an inlet end 42 adjacent the outer end of transition 36, and an opposed outlet end 44. In the depicted embodiment, the wall structure 38 includes a pair of interconnected, frustoconical segments 46 and 48, although a unitary wall structure could also be employed. The component 24 also has a outermost die plate assembly 50, which is secured to and covers the outlet end 44 of wall structure 38. The assembly 50 includes an apertured spider plate 51 and an outermost die plate 51a; the latter has a plurality of restricted orifice die openings 52 therethrough, which are arranged in an annular pattern as best seen in FIGS. 2 and 3. An outwardly extending knife spindle 53 is also secured to die plate 50, and supports a rotary cutting knife (not shown) which cuts the extrudate passing through the openings 52.

The component 24 is also equipped with a diverging flow diverter element 54 centrally located within and extending along the length of chamber 40. The element 54 is substantially conical in shape and is secured to the inner face of assembly 50 inboard of the die openings 52. As illustrated, the element 54 has a large diameter end 56 adjacent the assembly 50, and a small diameter end 58 proximal to inlet end 42.

It will also be observed that a restricted diameter venturi ring 60 is provided at the juncture between transition 36 and the inlet end 42 of wall structure 38. The function of ring 60 is to substantially equalize the flow and pressure of material passing through the components 22 and 24 to thereby assure that consistent products are delivered from these components.

It has been found that the wall structure 38 should preferably have an average angle of divergence between the inlet and outlet ends 42, 44, namely that of the segments 46, 48, of from about 8-40°, and more preferably from about 10-30°. As is evident from FIG. 4, the angle of divergence of segment 46 is identical with that of segment 48. In other embodiments, however, the segments may have moderately different divergence angles; nonetheless, the average angle of diversion in such situations is within the above ranges. Additionally, the element 54 should have a cone angle (between the center line of the element and the outer surface thereof) of from about 8-30° and more preferably from about 12-25°. Additionally, the venturi ring 60 should provide a reduction in cross-sectional are of from about 15-60%, more preferably from about 30-45%, as compared with the cross-sectional of the inlet end just upstream of the ring 60.

It will be appreciated that the design of the die component 24 serves to direct flow of material emerging from the discharge opening 18 into a diverging, annular, generally conical flow path between the wall structure 38 and the diverter element 54, whereby this material passes through the die openings 52. Of course, given the relative orientation of the components 22 and 24, the material passes along two essentially constant flow paths, having divergence angles consistent with those set forth above, namely from about 8-40°, and more preferably from about 10-30°.

EXAMPLES

The following examples set forth representative products and operational conditions using the die assembly 10 of the invention. It should be understood, however, that these examples are provided by way of illustration only, and nothing therein should be taken as a limitation on the overall scope of the invention.

A series of production runs were undertaken to prepare standard shrimp grower micro feed pellets, using a standard shrimp feed recipe. In each run, a dual die of the type described above was secured to the outlet end of a Wenger TX-3000 twin screw extruder. For most of the runs, the two die plates each had a total of 1,138 die holes having a diameter of 1.9 mm, and each die component was equipped with a 3.75 inch venturi ring, as illustrated in the drawings; in the last two runs, each die plate had a total of 1,256 die holes having a diameter of 1.6 mm. A Wenger HIP preconditioner was used upstream of the extruder inlet in order to moisturize the feed materials prior to extrusion. A rotary knife assembly was used to cut the extrudate as it emerged from the die openings. All of the extruded products had acceptable water stability and had 100% sinking properties.

In the runs, various parameters were altered, as set forth in the Tables below.

|  | Run # | | | | |
| --- | --- | --- | --- | --- | --- |
|  | Run 1 | Run 2 | Run 3 | Run 4 | Run 5 |
| Die Open Area/Ton | 921 | 921 | 806 | 806 | 1075 |
| Dry Feed Rate (kg/hr) | 7000 | 7000 | 8000 | 8000 | 6000 |
| Cylinder Water (kg/hr) | 1820 | 1820 | 1820 | 1820 | 1400 |
| Cylinder Water (%) | 26.0% | 26.0% | 26.0% | 26.0% | 20.0% |
| Cylinder Steam (kg/hr) | 630 | 630 | 630 | 630 | 630 |
| Cylinder Steam (%) | 9% | 9% | 9% | 9% | 9% |
| HIP Mix Intensity (%) | High | High | High | High | High |
| HIP Discharge Temp (0 C.) | 90 | 90 | 86 | 86 | 89 |
| Extruder Water (kg/hr) | 280 | 280 | 280 | 350 | 140 |
| Extruder Water (%) | 4% | 4% | 4% | 5% | 2% |
| Extruder Zone 1 (0 C.) | 91 | 95 | 93 | 93 | 83 |
| Extruder Zone 2 (0 C.) | 87 | 97 | 92 | 92 | 93 |
| Extruder Zone 3 (0 C.) | 86 | 94 | 92 | 92 | 97 |
| Total Wet Rate (kg/hr) | 9730 | 9730 | 10730 | 10800 | 8170 |
| Total Wet Rate (mton/hr) | 9.7 | 9.7 | 10.7 | 10.8 | 8.2 |
| Wet Density (g/l) L:R | 605/620 | 625/630 | 624/638 | 620/632 | 646/654 |
| Dryer Exit Density (g/l) | 615 | 619 | 619 | 620 | |
| Extruder Speed (rpm) | 300 | 300 | 300 | 300 | 300 |
| Extruder Motor Load (%) | 72% | 63% | 83% | 87% | 87% |
| Extruder Discharge Temp (0 C.) | 83 | 83 | 83 | 83 | 83 |
| Knife Speed (rpm) | 532 | 532 | 517 | 517 | 517 |
| Color | Light Brown | Dark Brown | Dark Brown | Light Brown | Dark Brown |

| | Run # | | | | |
|---|---|---|---|---|---|
| | Run 6 | Run 7 | Run 8 | Run 9 | Run 10 |
| Die Open Area/Ton | 921 | 921 | 806 | 645 | 841 |
| Dry Feed Rate (kg/hr) | 7000 | 7000 | 8000 | 10000 | 6000 |
| Cylinder Water (kg/hr) | 1400 | 1400 | 1400 | 1680 | 1820 |
| Cylinder Water (%) | 20.0% | 20.0% | 20.0% | 24.0% | 26.0% |
| Cylinder Steam (kg/hr) | 595 | 595 | 630 | 560 | 700 |
| Cylinder Steam (%) | 8.5% | 8.5% | 9.0% | 8.0% | 10.0% |
| HIP Mix Intensity (%) | High | High | High | High | High |
| HIP Discharge Temp (0 C.) | 91 | 91 | 89 | 89 | 93 |
| Extruder Water (kg/hr) | 140 | 210 | 210 | 350 | 490 |
| Extruder Water (%) | 2% | 3% | 3% | 5% | 7% |
| Extruder Zone 1 (0 C.) | 77 | 73 | 74 | 73 | 77 |
| Extruder Zone 2 (0 C.) | 79 | 77 | 76 | 76 | 81 |
| Extruder Zone 3 (0 C.) | 88 | 88 | 88 | 88 | 93 |
| Total Wet Rate (kg/hr) | 9135 | 9205 | 10240 | 12590 | 9010 |
| Total Wet Rate (mton/hr) | 9.1 | 9.2 | 10.2 | 12.6 | 9.0 |
| Wet Density (g/l) L:R | 646/640 | 700/690 | 676/680 | 634/650 | 670/670 |
| Dryer Exit Density (g/l) | | | | | |
| Extruder Speed (rpm) | 300 | 300 | 320 | 375 | 255 |
| Extruder Motor Load (%) | 77% | 73% | 89% | 86% | 92% |
| Extruder Discharge Temp (0 C.) | 83 | 83 | 83 | 83 | 83 |
| Knife Speed (rpm) | 517 | 374/458 | 374/458 | 558/558 | 658/604 |
| Color | Light Brown | Really Dark Brown | Really Dark Brown | Really Dark Brown | Really Dark Brown |

In Run 1, the uniformity of the extrudate between the two die plates was excellent, with no white streak discolorations. In Run 2, the same conditions of Run 1 were maintained, except that 1% oil was added to the feed formulation. This caused an increase in extrudate density and a smoother surface texture. The motor load on the extruder dropped 10%. In Run 3, the feed rate was increased and 1% oil was used. This increased the extrudate density and the surface uniformity was good. Motor load increased by 83%. Run 4 was a repeat of Run 3, but without added oil. Motor load increased as did extruder screw speed. The extrudate exhibited a slightly rougher surface, but product uniformity was still good. In Run 5, the number of cutting blades was reduced to create a product having an average length of 4 mm. The density was heavy, but product uniformity was good without white streaks. Run 6 was a repeat of Run 5, except that the feed rate was increased. Product uniformity was good and density was heavy, without white streaks. A small number of the pellets expanded upon extrusion. Run 7 was a repeat of Run 6, with 1% added oil. Uniformity remained good and the density was heavy, without white streaks. Run 8 was another repeat of Run 6, with 1% oil. Uniformity was good, density was heavy, with no white streaks. Run 9 was a repeat of Run 6 with 60 Hz oil. Uniformity good, density heavy, no white streaks. In Run 10, the feed rate was decreased to 6000 kg/hr, product acceptable. In Run 11, white streak pellets were produced initially, but this was eliminated with the addition of the balance of water.

These tests confirm that the use of a dual die in accordance with the invention is capable of producing high-quality, substantially uniform aquatic micro feeds at high production levels.

We claim:

1. A die assembly for a food or feed extruder including a tubular barrel presenting a discharge opening for processed material, said die assembly comprising:
   a die assembly mount configured to be secured to said barrel; and
   a plurality of tubular die components coupled with said mount and in communication with said barrel in order to simultaneously direct said processed material from said discharge opening into each of said plurality of die components, each die component including
   wall structure defining an outwardly diverging tubular chamber presenting an inner chamber surface, an inlet end adjacent said mount, and an opposed outlet end remote from said inlet end, said wall structure having an average diverging angle of from about 8-40°;
   a die plate secured to said outlet end and having an inner surface and an outer surface; and
   a diverging flow diverter element within said tubular chamber and having a large diameter end adjacent said inner surface of said die plate, an opposed small diameter end closer to said chamber inlet end, and an outer diverging surface between said large and small diameter ends, said flow diverter element presenting a longitudinal axis and an axial length,
   the area between said element outer diverging surface and said inner chamber surface defining a flow path for said material passing through said chamber,
   a flow-restricting venturi proximal to the inlet end of said chamber, said venture having a tubular inlet face defining an inlet opening remote from said diverter element, and an opposed, tubular outlet face presenting an outlet opening proximal to said diverter element, the diameter of said outlet opening being smaller than the diameter of said inlet opening,
   said die plate having a plurality of die openings therethrough located outboard of said large diameter end of said diverter element.

2. The die assembly of claim 1, said large diameter end of said flow diverter element secured to the inner surface of said die plate.

3. The die assembly of claim 1, said average diverging angle being from about 10-30°.

4. The die assembly of claim 1, said flow diverter element being generally conical in shape.

5. The die assembly of claim 1, said venturi presenting a reduction in cross-sectional area of from about 15-60%, as compared with the cross-sectional area of said inlet end of said chamber.

6. The die assembly of claim 5, said reduction in cross-sectional area being from about 30-45%.

7. The die assembly of claim 1, there being two of said die components.

8. The die assembly of claim 1, said die openings being arranged in an annular pattern about the large diameter end of said diverter element.

9. The die assembly of claim 1, said die mount having a tubular arcuate transition for each of said die components.

10. The combination comprising:
   a food or feed extruder including a tubular barrel presenting a discharge opening for processed material;
   a die assembly including a mount secured to said barrel, and a plurality of tubular die components coupled with said mount and in communication with said barrel in order to simultaneously direct said processed material from said discharge opening into each of said plurality of die components, each die component including
   wall structure defining an outwardly diverging tubular chamber presenting an inner chamber surface, an inlet end adjacent said mount, and an opposed outlet end remote from said inlet end, said wall structure having an average diverging angle of from about 8-40°;

a die plate secured to said outlet end and having an inner surface and an outer surface; and a diverging flow diverter element within said tubular chamber and having a large diameter end adjacent said inner surface of said die plate, an opposed small diameter end closer to said chamber inlet end, and an outer diverging surface between said large and small diameter ends, said flow diverter element presenting a longitudinal axis and an axial length, the area between said element outer diverging surface and said inner chamber surface defining a flow path for said material passing through said chamber, a flow-restricting venturi proximal to the inlet end of said chamber, said venturi having a tubular inlet face defining an inlet opening remote from said diverter element, and an opposed, tubular outlet face presenting an outlet opening proximal to said diverter element, the diameter of said outlet opening being smaller than the diameter of said inlet opening, said die plate having a plurality of die openings therethrough located outboard of said large diameter end of said diverter element.

11. The combination of claim 10, said large diameter end of said flow diverter element secured to the inner surface of said die plate.

12. The combination of claim 10, said average diverging angle being from about 10-30°.

13. The combination of claim 10, said flow diverter element being generally conical in shape.

14. The combination of claim 10, said venturi presenting a reduction in cross-sectional area of from about 15-60%, as compared with the cross-sectional area of said inlet end of said chamber.

15. The combination of claim 14, said reduction in cross-sectional area being from about 30-45%.

16. The combination of claim 10, there being two of said die components.

17. The combination of claim 10, said die openings being arranged in an annular pattern about the large diameter end of said diverter element.

18. The combination of claim 10, said die mount having a tubular arcuate transition for each of said die components.

19. The combination of claim 10, said extruder being a twin screw extruder.

\* \* \* \* \*